United States Patent
Fulmer

[11] 3,801,159
[45] Apr. 2, 1974

[54] BRAKE PROPORTIONING VALVE WITH CONTROLLED BLEND BACK

[76] Inventor: Keith H. Fulmer, 401 N. Bendix Dr., South Bend, Ind. 46620

[22] Filed: Nov. 13, 1972

[21] Appl. No.: 306,257

[52] U.S. Cl.................. 303/6 C, 188/349, 303/6 C
[51] Int. Cl............................................. B60t 11/34
[58] Field of Search........ 303/6 C, 6 R, 84 A, 84 R; 188/349, 152, 151 A, 151 R; 200/82 D; 340/52 C

[56] References Cited
UNITED STATES PATENTS

| 3,492,052 | 1/1970 | Klimek................................. 303/6 C |
| 3,653,722 | 4/1972 | Klimek................................. 303/6 C |
| 3,420,256 | 1/1969 | Kobnick............................... 303/6 C |
| 3,760,841 | 9/1973 | Daffron................................ 303/6 C |

Primary Examiner—Duane A. Reger
Assistant Examiner—D. C. Butler
Attorney, Agent, or Firm—Leo H. McCormick, Jr.; William N. Antonis

[57] ABSTRACT

A proportioning valve for the hydraulic system of a vehicle to control the braking force on the rear wheels with respect to that on the front wheels. The valve includes a housing formed with an inlet chamber connected to one line of the vehicle's dual master cylinder, and an outlet chamber in communication with the rear wheel brakes of the vehicle. The valve is normally open, permitting unimpeded fluid flow between the inlet and outlet chambers, during an initial brake application. However, when the pressure level in the outlet chamber reaches a first value, the valve reacts to restrict the flow between the two chambers so that the pressure level in the inlet chamber rises more rapidly than the pressure level in the outlet chamber up to a second value of pressure level within the outlet chamber. Upon attaining the second value of pressure level, the valve is acted upon by a pressure responsive member which causes the pressure level in the outlet chamber to increase at a greater rate than the pressure level in the inlet chamber. The pressure responsive member further includes fluid flow control means for regulating the rate of increase in pressure level in the outlet chamber so that the blend back of pressures between the inlet and outlet is more gradual. This pressure level in the outlet chamber continues to build up at this new accelerated rate until the chamber pressures are substantially the same, at which time the valve opens to establish substantially uninterrupted flow between the chambers.

6 Claims, 2 Drawing Figures

PATENTED APR 2 1974　　　　　　　　　　　　　　　3,801,159

BRAKE PROPORTIONING VALVE WITH CONTROLLED BLEND BACK

BACKGROUND OF THE INVENTION

This invention relates to a proportioning valve which is used in a vehicle hydraulic braking system for maintaining a braking force relationship between the front and rear brakes.

Numerous innovations have been employed in the automotive vehicle brake art to cope with the weight shift from the rear wheels to the front wheels when the vehicle is decelerated. The weight shift to the front wheels being caused by the vehicle attempting to rotate about its center of mass when braked. One approach to meeting this problem involved the use of larger brakes on the front wheels. However, this only improved front end braking but did not take care of the wheel "lock up" phenomenon, occurring at the rear wheels during a normal brake application, caused by weight shifting of the vehicle. With the present day trend to front wheel disc brakes, the "lock up" problem was intensified and, in fact, motivated the use of proportioning valves in the hydraulic lines to the rear wheel brakes to reduce the brake applying pressure. One form of proportioning valve of the prior art is described in U.S. Pat. No. 3,556,607 assigned to the common assignee of this invention. The use of proportioning valves to reduce the brake applying pressure on the rear wheel brakes prevents rear wheel lock up. Unfortunately, however, many of these valves will continue to reduce the braking pressure to the rear wheel brakes even though brake "fade" has set in and higher pressure levels in the vehicle's master cylinder are available for braking, thus depriving the rear wheel brakes of their full braking capacity in the event of brake "fade". Brake "fade" is characteristic of drum brakes when operated under high temperatures. Under "faded" conditions considerably higher braking pressures are required to move the shoes into the drums to effectively perform a braking function. This invention overcomes one of the deficiencies of prior art proportioning valves by utilizing maximum master cylinder pressure in spite of brake "fade" to thereby achieve the most effective braking. The invention is an improvement on the proportioning valve described in my application, Ser. No. 272,265 filed July 17, 1972 and assigned to the assignee of this invention.

SUMMARY OF THE INVENTION

A proportioning valve for the rear wheel brakes of a vehicle that includes fluid flow control means for regulating the rate of increase in pressure at the outlet so that the blend back of pressures between the inlet and outlet is at a controlled rate.

A proportioning valve located in the hydraulic line to the rear wheel drum brakes of a vehicle and including fluid flow control means responsive to master cylinder pressure sensed at the valve outlet above a predetermined value for blending the outlet pressure with the valve inlet pressure at a predetermined controlled rate up to equalization of the inlet and outlet pressure.

A proportioning valve responsive to a predetermined pressure level at its outlet for maintaining a lower pressure level at the rear brakes than that pressure developed at the master cylinder until the pressure level at the outlet attains a given value, at which time the inlet and outlet of the proportioning valve are connected together through fluid flow control means for regulating the blend back of pressures between the inlet and outlet so that braking on the rear brakes will be smooth during the transition from one pressure level at the outlet to a higher pressure level at the outlet.

DETAILED DESCRIPTION

Figure 1:
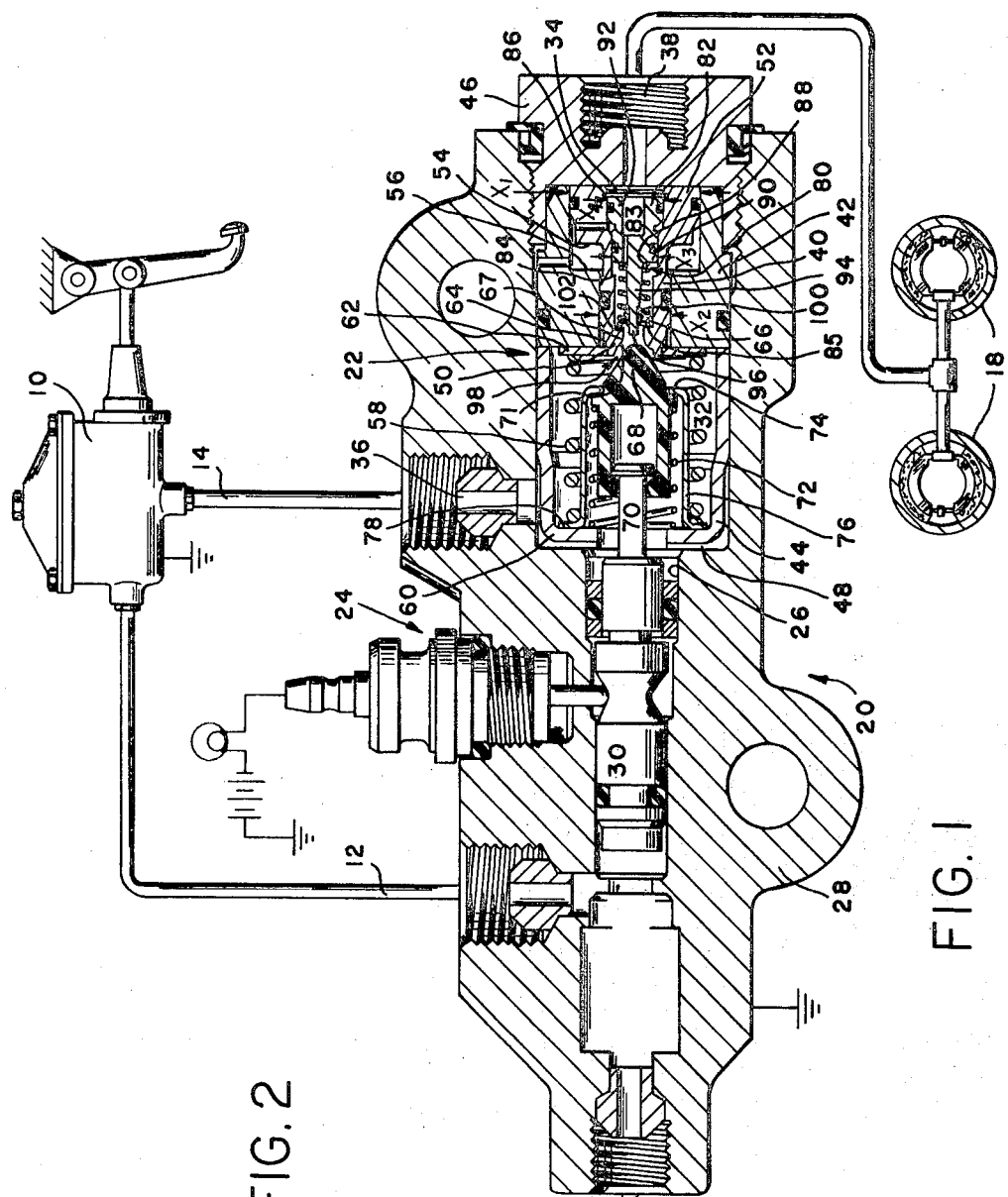
FIG. 1 is a schematic representation of a vehicle braking system incorporating a proportioning valve constructed in accordance with the invention and shown in longitudinal section.

Referring now to FIG. 1 of the drawing, the reference numeral 10 designates a dual master cylinder, having independent conduits 12 and 14, communicating respectively, with disc front brakes 16 and drum rear brakes 18 through a brake control mechanism 20. The control mechanism 20 includes proportioning valve means 22 and a brake failure warning device 24 located in a stepped bore 26 of housing 28. A switch actuating piston 30 of the brake failure warning device 24 is reciprocally positioned in the smaller diameter portion of the stepped bore 26 so as to sense the dual master cylinder pressures in communication with the brake control mechanism via lines 12 and 14. Brake failure warning devices are well known in the automotive vehicle brake art and since the device forms no part of the present invention no further explanation or description is believed necessary. For a complete description and explanation of the operation on warning devices of the type shown herein, reference is made to U.S. Pat. No. 3,556,607, owned by the assignee of the present invention.

The proportioning valve 22, which is located in the larger diameter section of the bore 26, divides that section of the bore into chambers 32 and 34, communicating respectively, with inlet port 36 and outlet port 38, the latter port being connected to the drum brakes 18. The valve 22 includes a plunger or valve piston 40 slidably mounted in an end closure member 42 of the bore for axial movement therein. The end member 42 is secured in the bore 26 between a cup-shaped member 44 and a plug 46 threadedly attached to the open end of the bore 26. Channels 48 in the cup-shaped member 44 establish communication between the inlet 36 and the inlet chamber 32. The piston 40 is provided with a smaller diameter end 50 exposed to the inlet chamber 32 and a larger diameter end 52 exposed to the outlet chamber 34. Accordingly, the piston 40 has a smaller effective area exposed to the inlet chamber and a larger effective area exposed to the outlet chamber. The larger effective area of end 52 has a diameter $X_1$ and the smaller effective area of end 50 has a diameter $X_2$. An abutment 54, formed between the ends 50 and 52 of the piston 40 engages an annular portion 56 of the member 42 to thereby limit valve piston movement to the left into the chamber 32. Displacement of the piston 40 to the right, as viewed in FIG. 1, is determined by engagement of the larger end 52 of the piston with the plug 46. The end plug 46 and the larger end 52 of the piston 40 form the outlet chamber 34. The piston 40 is urged to the right end of the bore against the plug 46 by a spring 58 which is interposed between a flange 60 of the cup-shaped member 44 and a flat annular member 62, having an opening 64 into which the smaller end 50 of the piston 40 fits. The piston 40 is formed with a central passage 66, including an orifice 67 communicating the inlet chamber 32 with the outlet chamber 34. The valve 22 further includes a poppet or valve member 68 reciprocally mounted to a stem 70 which is shown carried on one end of the piston 30 of the warning device 24. Although it should be understood that the stem 70 could be fixed axially with respect to its position in the bore and not carried on the piston 30 to meet the requirements of the invention. A spring 72 urges the valve member 68 against a radially inward extending flange 74 of a perforated retainer element 76. A radially outward extending flange 78 of the retainer element 76 is disposed between the spring 58 and the flange 60. The spring 58 is preloaded between the annular member 62 and the flange 60. The valve member 68 is located on the stem 70 in axial alignment with the piston 40 and the orifice 67 of the central passage 66 to control fluid flow through the passage and to regulate the pressure levels in the chambers 32 and 34. A valve seat 71 is formed in the orifice 67 for engagement by the valve member 68.

Should the braking condition of the vehicle be such that it becomes expedient to render brake proportioning to the rear brakes ineffective, for example, during brake "fade", additional means 80 is associated with the proportioning valve to perform this function. That is, means 80 is provided for overruling the action of the proportioning valve and subjecting the rear brakes to higher pressure levels by blending the then existing pressure level of the rear brakes into the higher levels of the master cylinder. The means 80 includes an internal piston or plunger 82 which is formed with a longitudinal opening 83 in registry with the passage 66. The piston 82 is concentrically located within the passage 66 of the valve piston 40 for sliding movement between a stepped shoulder 84 of the piston 40 and a retainer ring 86, the latter being positioned at the larger diameter end 52 of the piston 40. A spring 88 is preloaded between a shoulder 85 formed in the passage 66 and the internal piston 82, urging the piston 82 against the retainer ring 86. The internal piston 82 is stepped and is further provided with an annular end 90, having a diameter $X_3$, of lesser effective area than annular end 92, having a diameter $X_4$. Accordingly, fluid pressure within the central passage 66 and the outlet chamber 34 acts on these annular ends 90 and 92 respectively so that the net force developed by the fluid pressure tends to move the internal piston 82 to the left, as viewed in FIG. 1, against the preload of the spring 88. A pin or probe 94 is mounted integrally to the central portion of the internal piston 82 and projects along the central passage 66. The pin 94 is provided with a free end 96, terminating short of engagement with, but adjacent to the valve member 68. The relationship of the pin end 96 with respect to its engagement of the valve member 68 is such that when the internal piston 82 is urged against the retainer ring 86 the seat 71 of the piston 40 seats and unseats freely, without interference from the pin element 96, on the valve member 68 in proportioning the braking force of the rear brakes 18. However, when the pressure in the outlet chamber 34 attains a prescribed value with the net forces acting on the diameters $X_3$ and $X_4$ of the internal piston 82 are such as to move the piston 82 and probe 94 to the left, as viewed in the drawing, against the force of the spring 88. This movement of the piston 82 repositions the probe end 96, causing it to engage the valve member 68 to thereby prevent the member 68 from seating on the seat 71 of the piston 40, thus establishing continuous fluid flow between the inlet 32 and outlet 34 via the central passage 66. This action of the probe 94 on the valve member 68 which established continuous communication between the outlet and inlet, tends to create abrupt braking on the rear wheels caused by the sudden build up in outlet pressure. To offset this sudden pressure rise at the outlet and provide smoother braking during this transition period, fluid flow control means 98 is provided so that the inlet pressure is metered to the outlet at a predetermined rate. The control means 98 includes a valve element 100 secured to the free end 96 of the probe 94. The element 100 is of spherical design so that its surface is at times matingly contiguous to a seat 102 located at the inner end of the orifice 67 formed in the passage 66 at the smaller end 50 of the valve piston 40. It is noted that the flow control means 98 is essentially a second valve in series flow relationship with the valve member 68 and its seat 71 for metering fluid flow to the outlet at a time when the end 96 has engaged the member 68 to unseat the latter. The slope of the curve BC can be varied by changing the diameter of the seat 102.

MODE OF OPERATION

With reference to FIG. 1, the components of the brake control mechanism 20 are illustrated in the position they occupy during release of the vehicle brakes. To brake the vehicle, the foot pedal of the master cylinder 10 is depressed, developing hydraulic fluid pressure which is communicated to the inlet port 36 and the chamber 32 of the valve housing 28. Since the valve member 68 is now unseated from the seat 71 located in the orifice 67 at the smaller end 50 of the piston 40, the pressurized fluid in the chamber 32 causes fluid to flow through the central passage 66 and the outlet chamber 34 to the rear brakes 18. During the initial brake applying period when the valve member 68 is off the seat 71, the pressure levels are comparatively low and the fluid pressure in the inlet chamber 32 is the same as the pressure in the outlet chamber 34 up to a given pressure value, as shown by the line DA on the inlet-outlet pressure graph of FIG. 2. The same fluid pressure which appears in both chambers 34 and 32 respectively, acts on the area of the larger diameter end 52 of the piston 40, shown as $X_1$, and on the area of the smaller diameter end 50, shown as $X_2$. This, of course, creates a net force unbalance tending to displace the valve piston 40 to the left, as viewed in FIG. 1. As the master cylinder pressure continues to rise in the chambers 32 and 34, the fluid pressure in the outlet chamber 34 reaches a predetermined value A, as shown on the graph of FIG. 2, at which the net force acting on the piston 40 is sufficient to overcome the spring 58, displacing the piston to the left in FIG. 1, closing off communication through passage 66. Further increasing the fluid pressure level in the inlet chamber 32 subsequently unseats the piston 40 from the valve element 68 to thereby establish communication with the central passage 66, outlet chamber 34, and the rear brakes 24. This produces a rise in pressure at the outlet chamber. The rise in magnitude in the fluid pressure level in the outlet chamber 34, however, is only a fraction of the magnitude of the fluid pressure rise in the inlet chamber 32 before the valve closes again, since the area embraced by the diameter $X_1$ of the piston 40 is greater than the area embraced by the diameter $X_2$ located at the smaller end 50 of the piston which is exposed to inlet chamber pressure. This seating and unseating of the valve piston 40 and the valve member 68 continues as the pressure level rises in the inlet chamber 32, maintaining the pressure levels in the two chambers 32 and 34 in the ratio of the areas $X_1$ to $X_2$, with the pressure level in the outlet chamber 34 always less, as represented by line AB, up to point B on the curve of FIG. 2.

Figure 2:
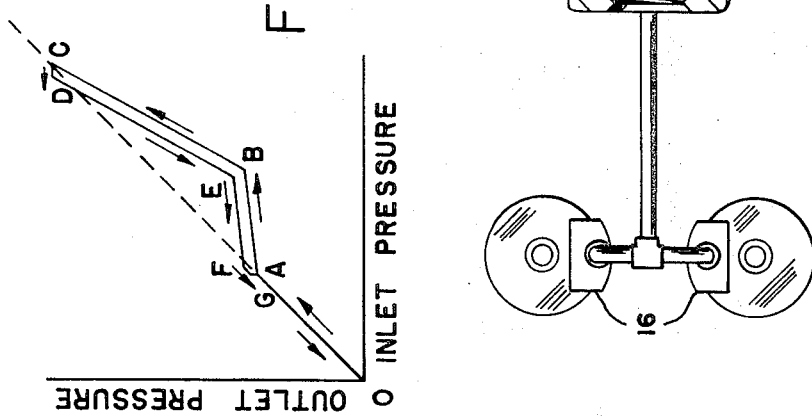
FIG. 2 is a graphical representation of the pressure levels appearing at the inlet and outlet of the proportioning valve of FIG. 1 under varying master cylinder pressures.

When the pressure in outlet chamber 34 attains a predetermined pressure level, such as point B on the graph in FIG. 2, the fluid pressure acting on the annular ends 90 and 92 of the internal piston 82, having diameters $X_3$ and $X_4$ respectfully, is now of such magnitude that the net force on the piston 82 moves the piston to the left, in FIG. 1, against the spring 88. This movement of the piston 82 positions the pin 94 so that its end 96 engages the valve member 68, preventing the valve from seating on seat 71 and completely closing off communication between the chambers. As the fluid pressure continues to rise in the outlet chamber 34, the internal piston 82 and pin 94 move farther to the left, thus creating a greater gap between the valve member 68 and the seat 71 located in the end of the valve piston 40. Since the outlet chamber 34 is now continuously open in varying amounts, via the gap between the member 68 and the end of valve piston 40, to the inlet chamber 32, the fluid pressure rise in the outlet chamber 34 is at a greater rate than the rise in the inlet chamber 32, until the point C on the curve in FIG. 2 is reached. Observe that from point B to point C on the curve of FIG. 2, the proportioning action of the valve means, i.e. maintaining the braking force on the rear brakes within a given range, has been overruled. Also note that the fluid flow control means 98 becomes effective at point B for establishing a prescribed pressure rise in the outlet chamber that will provide a gradual blend back of pressures between the inlet and outlet, thus creating a smooth braking cycle. More specifically, the valve element 100 is now cooperatively associated with the seat 102 in such a way as to regulate fluid flow at a predetermined rate from the inlet to the outlet so that the blend back to a higher outlet pressure will be at a controlled rate. At point C on the curve FIG. 2 the internal piston 82 has moved to the left so that the annular end 90 abuts the stepped shoulder 84 of the piston 40, forcing the pin end 96 out of the orifice 67 formed in open end of the central passage 66 so as to further displace the valve member 68, permitting uninterrupted fluid communication, between the chambers 32 and 34 and the rear brakes 18, except for the regulatory action exercised by the control means 98. Any further brake pressure increase beyond point C will cause the pressure levels in the chambers 32 and 34 to rise at about the same rate, since the valve means is open.

Upon release of the vehicle's brakes, the pressure levels within the chambers 32 and 34 will theoretically follow the curve as shown in FIG. 2, allowing for hysteresis losses, etc. of the component parts of the valve means. Initial brake release reduces the pressure level in the inlet chamber 32 until the pressure difference in the chambers is such as to cause the valve member 68 to readjust its relationship to the pin end 96 and consequently its position with respect to the seat 71 in the end 50 of the piston 40, indicated by point D in FIG. 2. Then the valve means 22 in conjunction with the combined action of means 80 and 98 meters fluid under pressure between the chambers 32 and 34 substantially along the curve DE of FIG. 2. At point E the spring 88 has moved the internal piston 82 and the pin 94 to the right so that the valve member 68 can seat on the seat 71 in the end of the passage 66 of the piston 40. A further reduction in inlet chamber pressure at this point meters fluid along the curve EF as the valve member 68 seats and unseats on the end 50 of the piston under the influence of the net force acting on the piston 40 which net force includes the pressure differential acting across the valve piston 40 and the force of springs 58 and 72, applied to the valve piston. As the inlet chamber pressure further decays, the spring 58 positions the valve piston 40 against the housing plug 46, as shown in FIG. 1, causing the pressure level in the chambers 32 and 34 to drop along the curve F to G to O.

I claim:

1. In a brake control mechanism for a vehicle hydraulic system:

a housing having an inlet port, an outlet port and a bore communicating the inlet port with the outlet port;

valve means in the bore dividing the bore into an inlet chamber and an outlet chamber, said inlet and outlet chambers communicating respectively, with the inlet port and the outlet port;

said valve means including a valve piston slidably arranged in the bore and provided with a passage therethrough communicating the inlet and outlet chambers, a seat in the passage, a valve member slidably located in the bore for seating on the seat, an internal piston slidably positioned in the passage of the valve piston and having a longitudinal opening in registry with the passage, and a pin element mounted along the longitudinal axis of the internal piston and extending through the passage toward the seat for engagement with the valve member to prevent seating;

said valve piston having a smaller diameter end of lesser effective area exposed to fluid pressure in the inlet chamber and a larger diameter end of greater effective area exposed to fluid pressure in the outlet chamber, said valve piston being spring biased to a first position unseating the valve piston from the valve member;

said internal piston having opposed annular ends, one annular end having an effective area greater than the effective area of the other annular end, said internal piston being spring biased in a direction causing withdrawal of the pin element from engagement with the valve member, said annular ends being exposed to outlet chamber pressure so that the net force developed on the opposed annular ends of the internal piston acts so as to move the internal piston against the spring bias;

said valve piston being responsive to a predetermined pressure level in the outlet chamber to seat said piston against the valve member and subsequently regulate the fluid flow between the chambers so that the fluid pressure level in the inlet chamber rises more rapidly than the fluid pressure level in the outlet chamber rises until a second predetermined pressure level in the outlet chamber is reached whereupon the spring biased internal piston is moved in a direction which drives the pin element against the valve member to unseat the latter so that the fluid pressure level in the outlet chamber rises more rapidly than the fluid pressure level in the inlet chamber until the fluid pressure level in the outlet chamber is almost the same as the fluid pressure level in the inlet chamber, at which time the valve piston and internal piston have moved the valve member to its maximum open position; and fluid flow control means effective upon said outlet chamber reaching its second predetermined pressure level for metering fluid flow from the inlet chamber to the outlet chamber at a predetermined rate.

2. The invention of claim 1:

said control means including a second seat in the passage, and a spherical valve element mounted to said pin with the surface of the valve element being matingly contiguous to the second seat for cooperating therewith in regulating flow to the outlet.

3. In a brake control mechanism for use in a vehicle hydraulic system:

a housing having an inlet port, an outlet port and a bore communicating the inlet port with the outlet port;

valve means disposed within the bore and dividing the bore into an inlet chamber and an outlet chamber, said inlet and outlet chambers communicating respectively, with the inlet and outlet ports;

said valve means having an open position wherein fluid communication is established between the chambers until a first fluid pressure level in the outlet chamber is reached whereupon the valve means responds to the first fluid pressure level to restrict fluid flow between the chambers to permit the fluid pressure level in the inlet chamber to rise more rapidly than the fluid pressure level in the outlet chamber rises until a second fluid pressure level in the outlet chamber is reached whereupon the valve means reacts to the second pressure level to adjust the valve means so that the fluid pressure level in the outlet chamber now rises more rapidly than the fluid pressure level in the inlet chamber up to a pressure level in the outlet chamber substantially the same as that in the inlet chamber whereupon said valve means opens to permit uninterrupted flow of fluid between the chambers;

said valve means having additional means operatively associated therewith which is responsive to the second fluid pressure level in the outlet chamber for establishing a more rapid rise in pressure level in the outlet chamber than that in the inlet chamber and further including fluid flow control means for metering the flow of fluid to the outlet chamber so that the rise in pressure in said outlet chamber is at a predetermined rate;

said valve means including a valve member reciprocally disposed in the bore and a valve piston slidably positioned in the bore, said valve piston having a smaller diameter end of lesser effective area exposed to fluid pressure in the inlet chamber and a larger diameter end of greater effective area exposed to fluid pressure in the outlet chamber;

said valve member cooperating with said valve piston to control the fluid pressure levels in the chambers;

resilient means acting on the smaller diameter end of the valve piston urging it to a position to establish communication between the chambers;

said valve piston having a fluid passage therein communicating the inlet chamber with the outlet chamber and an orifice in the passage; and said valve member being positioned adjacent the orifice at the smaller end of the valve piston to open and close the passage to effectively regulate fluid flow through the passage.

4. The invention of claim 9:

said additional means including an internal piston coaxially located in the passage of the valve piston and slidable between a first and a second position;

resilient means in the passage urging the internal piston toward the first position;

said internal piston having a longitudinal opening therethrough and opposed annular ends, one of the ends having an effective area greater than the effective area of the other annular end, said opposed ends being acted upon by the pressure level existing in the outlet chamber so that a net force is established on the ends of the internal piston tending to slide the piston against the resilient means and toward the second position; and a probe carried by the internal piston and projecting into the passage for engagement with the valve member upon movement of the internal piston to its second position.

5. The invention of claim 4:

said resilient means being a coil spring having opposite ends engaging respectively, the valve piston and the internal piston;

said probe being in the form of a pin integral with the internal piston and having a free end extending into the orifice in the smaller diameter end of the valve piston and through the coils of the spring.

6. The invention of claim 5:

said fluid flow control means including a valve element carried on the free end of the pin and a valve seat in the orifice with which the valve element cooperates to establish a predetermined pressure rise in the outlet chamber so that a gradual blend back of pressures between the inlet and outlet is achieved.

* * * * *